3,199,637
SHOCK ABSORBERS
Alejandro Herman, Perez Valenzuela 1257, Apt. 11,
Santiago, Chile
Filed Dec. 3, 1963, Ser. No. 327,636
1 Claim. (Cl. 188—96)

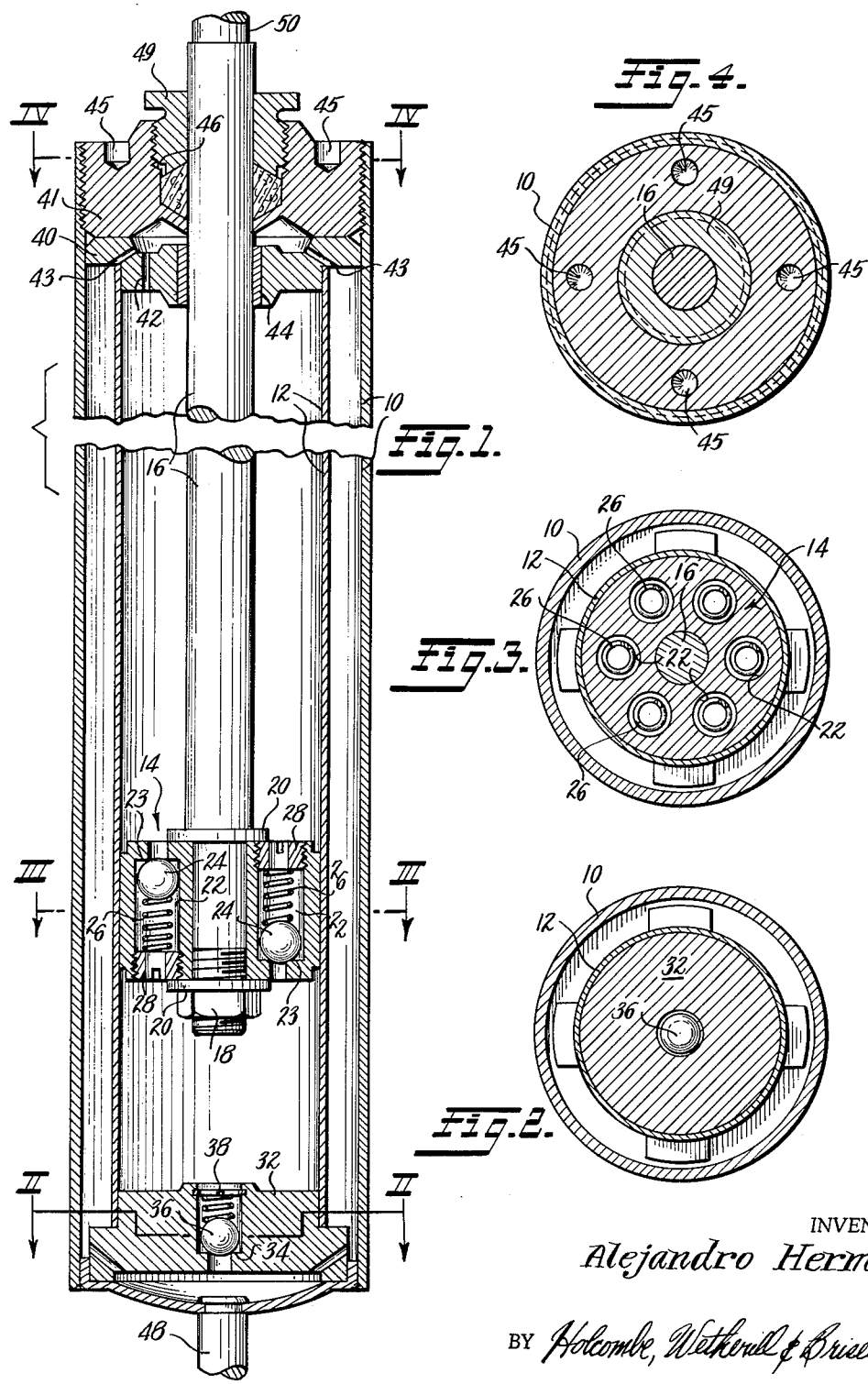

The present invention refers to shock absorbers and, more particularly, to an improved construction for a double action shock absorber which may be used for damping out swaying in a resiliently suspended automotive vehicle. However, such use is merely cited as an example, since it is to be understood that the improved shock absorber according to the invention is not limited to use in automotive vehicles only.

The classical construction of a shock absorber comprises a leak-proof cylinder filled with a suitable liquid medium; inside the cylinder there is a perforated piston which is moved by a piston-rod which extends to the outside of said cylinder, so that said piston may be moved axially in the fluid medium. For this purpose, the piston is provided with a plurality of axially extending perforations, and the ends of these perforations are closed by means of relatively resilient washers.

Due to the fact that such shock absorbers are used on automotive vehicles, they are subject to very frequent and severe use; and the elastic washers, which have the shape of a flat ring, cannot readily be made sufficiently resistant to the severe strains involved. They consequently do not long retain their flat shape or the resilience required to sufficiently restrain the passage of the liquid shock-absorbing medium to adequately buffer the movement of the piston and its piston-rod. Hence such washers have a short useful life and this implies that ordinary shock absorbers must undergo frequent repair in order to change worm washers for new ones. Such construction also makes the regulating of such shock absorbers a lengthy and awkward matter, for it can only be carried out by making physical changes in the washers, as by grinding, filing, etc., and this tends towards weakening the action of the shock absorber. Additionally, over-correction cannot be checked, the correction being irreversible, except by using new and stronger washers.

The shock absorber of the invention, which is mainly characterized by the shape of its piston, provides a means for obtaining a shock absorber that has a long useful life, has excellent shock-absorbing characteristics, and is easy to adjust, as will be apparent from the following detailed description when followed by an inspection of the attached drawing.

The new construction is simple, so that its cost is low. Its various components are easy to manufacture, and yet the characteristic of easy adjustment is maintained, and this adjustment can be used to make the action either weaker or stronger, as required.

In the drawing, FIG. 1 is a schematic longitudinal section of a shock absorber according to the invention, and FIGS. 2, 3 and 4, are cross sections taken respectively, along lines II—II, III—III and IV—IV of FIG. 1.

Referring now to FIG. 1, the drawing depicts a shock absorber composed of two concentric cylinders, an exterior cylinder 10, destined to act as a reservoir for excess liquid medium, and an inner cylinder 12, which is the shock absorbing cylinder proper. Within the inner cylinder 12 there is slidably mounted a piston 14, movable toward either end of cylinder 12, in response to force applied through the piston rod 16 to the piston 14 from outside the cylinders. The piston rod is attached to the piston by a nut 18 and two washers 20, one above and the other below the piston. The other or outer end of the piston rod is connected, for example, to the chassis of an automotive vehicle, either by means of a bolt 50 acting on some resilient part connected to said chassis, or by means of a movable joint comprising a washer, a hook or other means, in a conventional manner. On the other hand, the outer or fixed cylinder 10 is attached, at its base 48, to a part of the suspension of the vehicle or other appropriate part, the movement of which is to be damped.

The piston 14 is perforated by a plurality of holes 22, usually disposed in a concentric circle around the piston rod. FIGURE 1 depicts six such perforations, which extend axially of the cylinder. Six perforations are preferred, for a reason later to be given. These holes have means for controlling the passage of liquid therethrough; a certain number of these holes regulate passage of liquid from the lower to the upper side of the piston, the other holes acting in the opposite direction. The control means comprises a valve seat 23, a small metallic ball, preferably of steel, 24, a coiled spring 26 which is used for graduating the pressure on said ball 24 and hence the pressure at which said valve will allow liquid medium to pass through the hole controlled thereby, and finally, a hollow externally threaded bolt or plug 28, acting within a corresponding internal thread in the end of the hole that is farthest away from the valve seat 23. The hollow bolt 28 has an axial perforation and thus the liquid shock absorbing medium, when adequate pressure results from the movement of the piston, will raise the ball 24 from valve seat 23 and the shock absorbing fluid will then flow through the holes in the piston. These valve assemblies are alternately positioned in the successive holes in the piston, so that some of them open upward while the others can open downward, and in the prefererd embodiment this alternating of positions of the valve seats 22 obtains all the way around the ring of holes.

The pressure required to open each valve may be adjusted by simply turning the threaded bolt 28 by means of a suitable tool, such as a screw-driver or a polygonal rod.

In order to maintain a desired position of the valves, once they have been adjusted, the setting of the bolts 28 is locked, preferably by means of the two washers 20. In fact, if we use six perforations in the piston, as in the preferred embodiment, three of these holes, alternating with the other three, will have their corresponding bolts 28 on one side of the piston, and the other three will have them on the other side of the piston. Now, when tightening nut 18 in order to fix the piston rod to the piston, both washers 20 will be clamped against the heads of the bolts 28, securely locking said bolts against rotation. Thus the setting will not be lost. Naturally, the outside diameter of washers 20 is so chosen that the washer does not cover the perforations in the threaded bolts 28, but just grips the inside edges of said bolts; thus a free flow of the hydraulic fluid is assured through said perforations. Of course, it would be possible to use washers of larger diameter, but in such case it would be necessary to perforate these washers with axial holes corresponding to those in the threaded bolts 28 and the washers must be so mounted, that these holes are in alignment. Likewise, the washers 20 should be so dimensioned, that at the point of contact with nut 18 and at the part where the end of the piston rod contacts the upper washer 20, there is a certain amount of play between the piston rod and the washers, such as could be obtained by imparting a slight sphericity to their respective seats, and thus the washers may accommodate themselves to a situation in which the three heads of the threaded bolts on one side of the piston which correspond to each washer are not quite normal to the piston rod axis, when the bolts 28 have been adjusted to the desired positions and the place defined by these three heads is, as will happen in the majority of cases.

If for any reason it should be decided to use more or less than 6 perforations in the piston, then special precautions should be taken by providing suitable locking means for maintaining the adjustments imparted to the various threaded bolts as required by the valve settings determined on. Such means might include lock-nuts, set screws, and so forth.

The other parts of the shock absorber are of a conventional type, but will be recited now in order that the operation of the improved shock absorber may be better understood.

In the lower part of cylinder 12, as seen in FIG. 1, there is a plug 32, which seals the lower end of the shock absorber in a leak-proof manner. The joint may be merely a pressure fit. This plug contains a valve, formed by a valve seat 34, a metal ball 36, and a small wire net or pin 38 to retain the ball within the valve proper. If desired, a coil spring may be used to bias the ball against its seat. The ball can move a short axial distance within the valve bore. When piston 14 is raised (as seen in FIG. 1), valve ball 36 lifts and admits hydraulic fluid from reservoir 10 to the inside of cylinder 12, below the piston 14. This will only be the case when piston 14 has been raised in such a violent fashion, that there has not been material time for liquid medium to pass from the upper part of piston 14 to its lower part through the perforations and valves in said piston, i.e., through those valves that control passage downward of the hydraulic fluid.

In the upper part of the shock absorber, there is a cap 40 which is a sliding fit in the cylinder 10, and has a few suitable perforations 42, 43, which interconnect the inner cylinder 12 with the outer cylinder 10. These small perforations allow alleviation of any excess pressure that may be produced in the hydraulic fluid inside the cylinder 12 above the piston 14, when said piston rises. Thus the liquid medium returns to the space between the inner and outer cylinders. This cap 40 also has a bushing 44 for guiding the piston rod and to take wear. Bushing 44 is a small but wear-resisting part, and its renewal in case of eventual wear can be carried out very simply and at a very low cost.

A threaded cover 41 is screwed into a cooperating screw thread on the inside of external cylinder 10 over cap 40, the object being to hold all the parts together and in their proper places, as will be evident from a study of FIGURE 1. For screwing this cover 41 on or off, its outer face is provided with several small recesses 45, into which the points of an appropriate tool may be inserted. This cover has a suitable stuffing box for the passage of the piston rod, formed by a cavity 46 which receives a suitable packing, for example, one of asbestos and graphite, and a conventional gland 49. This practically assures a leak-tight seal against loss of the hydraulic fluid in the shock absorber.

The double acting shock absorber of the invention can use as its hydraulic fluid any conventional filling fluid, mineral oils, or the so-called "flash fluids", as may be desired.

The shape of the piston shown in the drawings is merely schematic; the piston may obviously be provided with piston rings or with any other type of packing of a conventional type (not shown), in order to enhance its leak-proofing qualities.

Among the many advantages of the shock absorber of the invention, we should mention the extreme simplicity with which its effects may be adjusted. In fact, a mere turning of the lugs or bolts 28 in one direction or the other, will change the biassing force on the valve balls 24 that control the passage of shock absorber fluid means through piston 14 and, in consequence the shock-absorbing effect, which can thus be enhanced or lowered at will. Then again, it is possible so to set the various valves by means of their bolts 28, that the effect of the shock absorber in one direction is greater, and less in the other, in this case either greater up than down, or greater down than up. Should the shock absorbing effect suddenly become considerably lessened, it will surely mean that one or more of the springs 26 has failed and it is an easy matter to replace same. Pitting of the valve seats 22 can also be repaired without undue trouble.

Although the shock absorber according to the invention has been described more specifically with reference to its use in an automotive vehicle, it must be evident that the scope of the invention is not limited to this particular application, for a shock absorber can be used for many other purposes and may even, in some cases, be used in an inclined or horizontal position. In the latter case it may be advisable to alter the form of the valve seat and its functioning at 36, 38, but this does not require any substantial change in the invention, as defined by the following claim.

What is claimed is:

In a double acting shock absorber comprising in combination an outer cylinder which acts as a fluid reservoir, an inner cylinder within said outer cylinder, a valve at one end of said inner cylinder which permits fluid flow only from said outer cylinder to the inner cylinder of the shock absorber, orifices at the other end of said inner cylinder which communicate with said outer cylinder, a piston within the inner cylinder, and a piston rod attached to said piston which extends axially outside the cylinders, the improvement according to which said piston is perforated by six axial holes, said shock absorber comprising check valves for said holes positioned to permit passage of said fluid through three of said holes in one axial direction and through the other three of said holes in the other axial direction, those check valves permitting passage of fluid in said one direction being alternated with those permitting passage in the other direction around a circle in the piston concentric with said axis, said check valves being individually adjustable to provide various degrees of resistance to the passage of fluid through said holes and comprising setting means which protrude at all settings beyond a working surface of the piston, washer means on said piston rod lapping over said setting means while permitting the free passage of fluid through said holes, and means for applying pressure to said washer means to lock said setting means in position.

References Cited by the Examiner

UNITED STATES PATENTS

| 1,745,357 | 2/30 | Crowell | 267—8 X |
| 2,467,098 | 4/49 | Rossman | 137—493.8 |
| 3,084,566 | 4/63 | Pistillo | 188—88 |

FOREIGN PATENTS 920,709  11/54  Germany.

ARTHUR L. LA POINT, *Primary Examiner.*

EUGENE G. BOTZ, *Examiner.*